(12) United States Patent
Jones

(10) Patent No.: US 11,930,034 B2
(45) Date of Patent: Mar. 12, 2024

(54) TECHNIQUES FOR DETERMINING LEGITIMACY OF EMAIL ADDRESSES FOR ONLINE ACCESS CONTROL

(71) Applicant: KOUNT, INC., Boise, ID (US)

(72) Inventor: Matthew Lewis Jones, Boise, ID (US)

(73) Assignee: Kount, Inc., Boise, ID (US)

( * ) Notice: Subject to any disclaimer, the term of this patent is extended or adjusted under 35 U.S.C. 154(b) by 327 days.

(21) Appl. No.: 17/357,866

(22) Filed: Jun. 24, 2021

(65) Prior Publication Data

US 2022/0417275 A1    Dec. 29, 2022

(51) Int. Cl.
*H04L 9/40* (2022.01)
(52) U.S. Cl.
CPC ........ *H04L 63/1433* (2013.01); *H04L 63/126* (2013.01)
(58) Field of Classification Search
CPC ............... H04L 63/1433; H04L 63/126; H04L 63/1441; H04L 63/1483
USPC .......................................................... 726/25
See application file for complete search history.

(56) References Cited

U.S. PATENT DOCUMENTS

| | | | |
|---|---|---|---|
| 2011/0137999 A1* | 6/2011 | Amsterdam | G06Q 10/107 709/206 |
| 2013/0325991 A1* | 12/2013 | Chambers | H04L 51/212 709/206 |
| 2017/0374076 A1* | 12/2017 | Pierson | H04L 63/08 |
| 2020/0067861 A1* | 2/2020 | Leddy | G06F 21/6245 |

FOREIGN PATENT DOCUMENTS

WO    WO-2007033344 A2 *    3/2007    ....... H04L 29/06027

* cited by examiner

*Primary Examiner* — Bryan F Wright
(74) *Attorney, Agent, or Firm* — Kilpatrick Townsend & Stockton LLP

(57) ABSTRACT

Various aspects involve determining legitimacy of an email address for risk assessment or other purposes. For instance, a risk assessment computing system receives a risk assessment query that identifies an email address. The risk assessment computing system determines a set of features for the email address. For each feature, the risk assessment computing system calculates an illegitimacy score by calculating a deviation of the feature from an expected safe value for the feature that is determined from historical email addresses. The risk assessment computing system aggregates the illegitimacy scores of the plurality of features into an aggregated illegitimacy score and further transmits a legitimacy risk value to a remote computing system. The legitimacy risk value indicates the aggregated illegitimacy score and can be used in controlling access of a computing device associated with the email address to one or more interactive computing environments.

20 Claims, 7 Drawing Sheets

| TYPE OF FEATURE | EXAMPLES |
|---|---|
| Physical Characteristics | length of the email username, popularity of the selected domain, length of the full email address |
| Composition of the Email Address | the proportions of vowel, consonant, digit, unique, special, hexadecimal, QWERTY top-, middle-, and bottom-row characters over the length of the email username |
| Cross-term Compositions | the ratio of vowels to consonants, or hexadecimal to unique characters for the above composition character types |
| Email Username ID matching | the proportion of the provided billing/shipping first/last name present in the email username text, the proportion of provided zip code in the email username text |
| Markov Chain Analysis | Probability of the characters appear in a good email address in the same order |

FIG. 3

| TYPE OF CHARACTER | VALUE |
|---|---|
| VOWEL | "A", "E", "I", "O", "U" |
| DIGIT | "0", "1", "2", "3", "4", "5", "6", "7", "8", "9" |
| CONSONANT | "B", "C", "D", "F", "G", "H", "J", "K", "L", "M", "N", "P", "Q", "R", "S", "T", "V", "W", "X", "Y", "Z" |
| QWERTY TOP ROW | "Q", "W", "E", "R", "T", "Y", "U", "I", "O", "P" |
| QWERTY HOME ROW | "A", "S", "D", "F", "G", "H", "J", "K", "L" |
| QWERTY BOTTOM ROW | "Z", "X", "C", "V", "B", "N", "M" |
| HEXADECIMAL | "0", "1", "2", "3", "4", "5", "6", "7", "8", "9", "0", "A", "B", "C", "D", "E", "F" |

TECHNIQUES FOR DETERMINING LEGITIMACY OF EMAIL ADDRESSES FOR ONLINE ACCESS CONTROL

TECHNICAL FIELD

The present disclosure relates generally to artificial intelligence and cybersecurity. More specifically, but not by way of limitation, this disclosure relates to determining the legitimacy of a given email address to facilitate the determination of the risk of granting access of a computing device associated with the email address to an online computing environment, thereby preventing malicious access to and improving the security of the online computing environment.

BACKGROUND

Email addresses are often required for certain online activities, such as opening an account on an online platform or completing a transaction on the online platform. In those cases, illegitimate emails in the form of randomly generated or disposable email addresses are commonly used for nefarious online activity. Assessing risks associated with an email address helps to prevent such nefarious activity or limit the propagation of the email address throughout the greater Internet. Historical data associated with an email address, such as previously opened accounts or transaction history, may provide useful information for assessing the risks associated with the email address. However, due to the ease with which an illegitimate email address can be created, it is likely that an incoming questionable email address will not have been seen before, so such historical data does not exist for the email address. Existing systems often lack a mechanism for determining whether an email is illegitimate without having access to previous data associated with the email address. As a result, the high risk associated with an illegitimate email address may be undetected or detected too late to be addressed, which eventually leads to a misuse of resources or fraudulent transactions for the system.

SUMMARY

Various aspects of the present disclosure provide systems and methods for determining the legitimacy of an email address to facilitate the determination of the risk of granting access of a computing device associated with the email address to an online computing environment. In one example, a risk assessment computing system receives a risk assessment query that identifies an email address and determines a plurality of features for the email address. Determining the plurality of features includes determining a feature based on characters contained in the email address. For each feature of the plurality of features, the risk assessment computing system calculates an illegitimacy score by calculating a deviation of the feature from an expected safe value for the feature that is determined from historical email addresses. The risk assessment computing system aggregates the illegitimacy scores of the plurality of features into an aggregated illegitimacy score and transmits a legitimacy risk value indicating the aggregated illegitimacy score to a remote computing system for use in controlling access of a computing device associated with the email address to one or more interactive computing environments.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

FIG. 3 shows examples of different types of features determined for an email address, according to some aspects described herein.

FIG. 4 shows examples of different types of characters that may be contained in an email address, according to some aspects described herein.

DETAILED DESCRIPTION

Figure 1:
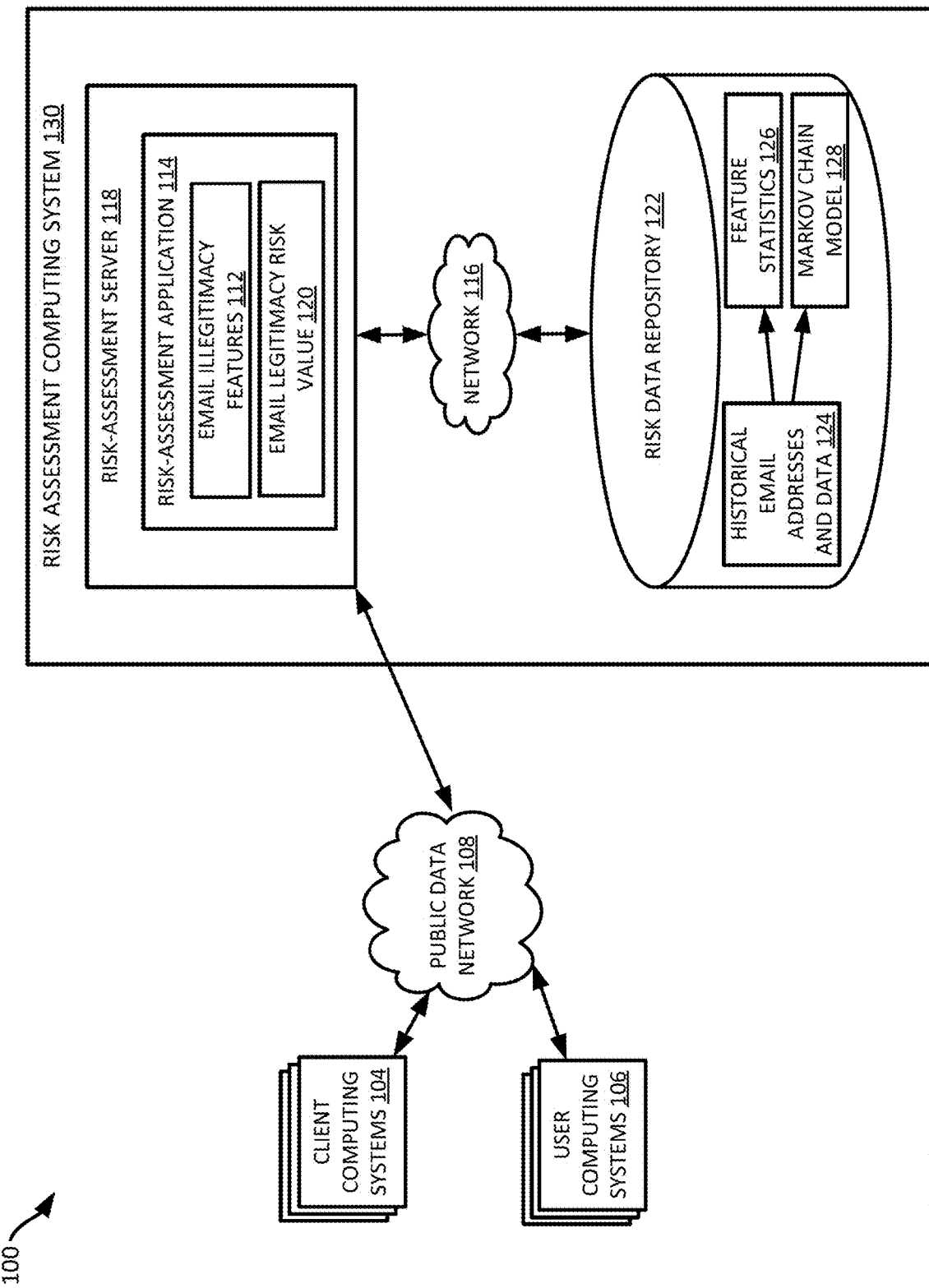
FIG. 1 is a diagram of an example of a computing environment in which the legitimacy of a given email address is determined to facilitate the determination of the risk of granting access of a computing device associated with the email address to an online computing environment, according to some aspects described herein.

Certain aspects and features of the present disclosure involve determining the legitimacy of an email address to facilitate the determination of the risk of granting access of a computing device associated with the email address to an online computing environment. In one example, features are determined for an email address in order to determine its legitimacy. These features can be determined solely based on the characters contained in the email address and without any prior knowledge of the historical behavior of the email address. For each of the features, an illegitimacy score is calculated to measure the deviation of the feature from an expected safe value for the feature. The illegitimacy scores are aggregated and converted to an email legitimacy risk value, which can be used to determine the risk of granting access of a computing device associated with the email address to an interactive online computing environment.

For example, a risk-assessment system may receive from a client computing system a risk assessment query including an email address to be assessed. The risk-assessment system can generate email illegitimacy features (or "features") from the email address solely based on the characters contained in the username of the email address or the full email address. For example, the email illegitimacy features can include physical characteristics of the email address, such as the length of the email username, the length of the full email address, the verification status of the domain of the email address. The features can also include the composition of the email address, such as the proportions of vowel, consonant, digit, unique, special, hexadecimal, QWERTY top-, middle-, and bottom-row characters over the email user name or the full email address. The features may further include cross-term compositions, such as the ratio of vowels to consonants, or the ratio of hexadecimal to unique characters. In this way, features can be generated even for email addresses that the system has never seen before.

In some cases, the email address is not new to the risk assessment system and may have historical data associated therewith. For example, the email address may have been used to request access to another online computing environment before. As such, there may be other data associated with this email address, such as the name or address of the user associated with the email address. In those cases, the risk assessment system may generate additional features by leveraging the historical data. For example, the risk assessment system may generate features that show the matching between the email username and an identifier in the historical data, such as the proportion of the first or last name present in the email username text, or the proportion of zip code present in the email username text. In this way, historical data can be utilized to improve the accuracy of the email legitimacy determination.

In a further example, a Markov chain model can be developed based on historical data collected for legitimate email addresses. The Markov chain model can be used to calculate the probability of a character appearing in an email address given its previous characters. The risk assessment model can use the Markov chain model to calculate a probability for each character in the email address given its previous characters. Based on these probabilities, the risk assessment system can generate another feature for the email address, such as a feature by averaging, multiplying, or otherwise combining these probabilities.

Continuing with this example, for each of the features calculated for the email address, the risk-assessment system can determine an illegitimacy score measuring a deviation of the feature from an expected value of the feature. The expected value for a feature can be calculated using email addresses in a database that have been identified or determined to be legitimate email addresses. For example, if an email address is associated with a sufficient amount of access requests and there are with no negative behaviors associated therewith, the email address can be identified as a legitimate email address. Features discussed above can be generated for each of the legitimate email addresses. Statistics for a particular feature can be calculated from the values of this particular feature determined for different legitimate email addresses. The same process can be repeated for each feature to obtain the statistics for the corresponding feature. The statistics for a feature may include, for example, the median and the interquartile range (IQR) of the feature. In this example, the risk assessment system can determine that the expected safe value for the feature is the median and the deviation from the expected safe value is measured by the number of IQRs. Similarly, the statistics for a feature may include the mean and standard deviation of the feature. In this case, the expected safe value for the feature can be set to be the mean and the deviation from the expected safe value can be measured by the number of standard deviations.

The risk-assessment system further aggregates the illegitimacy scores for different features generated for the email address to generate an aggregated score. The aggregation can be performed by calculating, for example, the mean, maximum, sum, or L2 norm of the illegitimacy scores. The aggregated score can be converted into an email legitimacy risk value through a monotonic transform function. By using the transform function, the email legitimacy risk value can be normalized to a certain range, such as 0-1. The false-positive rate and false-negative rate of the legitimacy determination can be adjusted based on parameters and the type of the transform function.

The risk assessment system can transmit the email legitimacy risk value for the email address to the client computing system. The client computing system can control, based on the email legitimacy risk value, access of a computing device associated with the email address to one or more online computing environments hosted or otherwise managed by the client computing system.

As described herein, certain aspects provide improvements to the security of the online computing environment by providing accurate risk assessment associated with an email address provided along with an online access request. Compared with existing methods that rely on historical data of the email addresses to determine their legitimacy, the technologies presented herein can determine the legitimacy of an email address solely based on the email address itself and without relying on any prior knowledge on the behavior of the email address. Further, for email addresses that do have historical data available, the technologies presented herein can improve the accuracy of the determination by including information contained in the historical data. Because the legitimacy of an email address can be determined even without prior knowledge, illegitimate email addresses, even if they are newly generated, can be identified. Access to online computing environments by computing devices associated with illegitimate email addresses can be prevented, or at least alerted, thereby improving the security of the online computing environment.

Additional or alternative aspects can implement or apply rules of a particular type that improve existing technological processes involving determining email address legitimacy. For instance, to determine the features for an email address, a particular set of rules are employed to define and calculate these features. This particular set of rules allow proper and relevant features to be extracted from the email address even for new email addresses that have not been seen before. Additional rules are used to calculate the illegitimacy scores of these features, such as rules for defining and calculating safe feature values, and rules for calculating the illegitimacy score of a feature to be the deviation of the feature from the corresponding safe feature value. Without these rules, the legitimacy of the email addresses cannot be accurately assessed.

Further rules, such as rules for aggregating the illegitimacy scores and rules for converting the aggregated illegitimacy score into an email legitimacy risk value, help to normalize the risk values. The normalized risk values allow the legitimacy of different email addresses to be compared with another one to assess the relative legitimacy among different email addresses.

The illustrative examples herein are given to introduce the reader to the general subject matter discussed and are not intended to limit the scope of the disclosed concepts. The following sections describe various additional features and examples with reference to the drawings in which like numerals indicate like elements, and in which descriptions are used to describe the illustrative examples but, like the illustrative examples, should not be used to limit the present disclosure.

Operating Environment Example for Risk Evaluation Based on Email Legitimacy

Referring now to the drawings, FIG. 1 is a diagram of a computing environment 100 in which a risk assessment computing system 130 determines the legitimacy of a given email to facilitate the determination of the risk of granting access of a computing device associated with the email address to an online computing environment, according to some aspects described herein.

FIG. 1 illustrates an example of hardware components of a risk assessment computing system 130, which may be distributed across one or more computing devices. In some aspects, the risk assessment computing system 130 is a specialized computing system that may be used for processing large amounts of data, possibly using a large number of computer processing cycles. The risk assessment computing system 130 can include a risk-assessment server 118 for performing a risk assessment for a given email address.

The risk-assessment server 118 can include one or more processing devices that execute program code, such as a risk-assessment application 114. The program code is stored on a non-transitory computer-readable medium. The risk-assessment application 114 can execute one or more processes to determine email illegitimacy features 112 and an email legitimacy risk value 120 based on information, such as characters in the email address, historical email addresses and data 124, and so on.

The historical email addresses and data 124 can be stored in one or more network-attached storage units or other storage devices on which various repositories, databases, or other structures are stored. An example of these data structures is the risk data repository 122, as shown in FIG. 1.

Network-attached storage units, such as the risk data repository 122, may store a variety of different types of data organized in a variety of different ways and from a variety of different sources. For example, the network-attached storage unit may include storage other than primary storage located within the risk-assessment server 118 that is directly accessible by processors located therein. In some aspects, the network-attached storage unit may include secondary, tertiary, or auxiliary storage, such as large hard drives, servers, virtual memory, or other types. Storage devices may include portable or non-portable storage devices, optical storage devices, or various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory, or memory devices.

The risk assessment computing system 130 can communicate with various other computing systems, such as client computing systems 104. For example, client computing systems 104 may send risk assessment queries to the risk-assessment server 118 for risk assessment, or may send signals to the risk-assessment server 118 that controls or otherwise influences different aspects of the risk assessment computing system 130. The client computing systems 104 may also interact with user computing systems 106 via one or more public data networks 108 to facilitate interactions between users of the user computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a seller, lender, or other provider of products or services. The client computing system 104 can include one or more server devices. The one or more server devices can include or can otherwise access one or more non-transitory computer-readable media. The client computing system 104 can also execute instructions that provide an interactive computing environment accessible to user computing systems 106. Examples of the interactive computing environment include a mobile application specific to a particular client computing system 104, a web-based application accessible via a mobile device, or the like. The executable instructions are stored in one or more non-transitory computer-readable media.

In some aspects, the executable instructions for the interactive computing environment can include instructions that provide one or more graphical interfaces. The graphical interfaces are used by a user computing system 106 to access various functions of the interactive computing environment. For instance, the interactive computing environment may transmit data to and receive data from a user computing system 106 to shift between different states of the interactive computing environment, where the different states allow access to a computing environment hosted by the client computing system 104 or the different states may allow one or more electronics transactions between the user computing system 106 and the client computing system 104 to be performed.

In some examples, a client computing system 104 may have other computing resources associated therewith (not shown in FIG. 1), such as server computers hosting and managing virtual machine instances for providing cloud computing services, server computers hosting and managing online storage resources for users, server computers for providing database services, and others. The interaction between the user computing system 106 and the client computing system 104 may be performed through graphical user interfaces presented by the client computing system 104 to the user computing system 106, or through an application programming interface (API) calls or web service calls.

A user computing system 106 can include a computing device or other communication device operated by a user, such as a consumer or a customer. The user computing system 106 can include one or more computing devices, such as laptops, smartphones, or other personal computing devices. In various examples, the user computing system 106 can allow a user to access certain online services from a client computing system 104 or other computing resources, to engage in mobile commerce with a client computing system 104, to obtain controlled access to electronic content hosted by the client computing system 104, or for other purposes.

For instance, the user can use the user computing system 106 to engage in online activities (also referred to as electronic transactions) with a client computing system 104 via an interactive computing environment. An electronic transaction between the user computing system 106 and the client computing system 104 can include, for example, opening an account at an online platform hosted by the client computing system 104, requesting online storage resources managed by the client computing system 104, acquiring cloud computing resources (e.g., virtual machine instances) managed by the client computing system 104, completing an online purchase transaction in an e-commerce platform hosted by the client computing system 104, and so on. An electronic transaction between the user computing system 106 and the client computing system 104 can also include, for example, querying a set of sensitive or other controlled data, accessing online financial services provided via the interactive computing environment, submitting an online credit card application, or other digital application to the client computing system 104 via the interactive computing environment, or operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc. A user computing system 106 can be used to request access to the interactive computing environment provided by the client computing system 104, which can selectively grant or deny access to various electronic functions. Based on the request, the client computing system 104 can collect the email address associated with the user and communicate with the risk-assessment server 118 for risk assessment. Based on the email legitimacy risk value 120 predicted by the risk-assessment server 118, the client computing system 104 can determine whether to grant the access request of the user computing system 106 to certain features of the interactive computing environment. The determination can be made by communicating with the risk-assessment server 118 for risk assessment or through an internal risk assessment model.

For example, the email legitimacy risk value 120 can be generated to indicate the associated risk based on the email address. The email legitimacy risk value 120 can be utilized by the service provider (e.g., the online resource provider, the e-commerce service provider, or the financial service provider) to determine the risk of the user associated with the email address accessing the service provided by the service provider, thereby granting or denying access by the user to an interactive computing environment implementing the service. The determination of the risk of the user can also be based on the email legitimacy risk value 120 along with other factors, such as a credit risk value, a resource usage risk value, transaction histories, and other information associated with the user. If the service provider determines that the email legitimacy risk value 120 is lower than a threshold email legitimacy risk value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials and/or the dedicated web address, the user computing system 106 can establish a secure network connection to the computing environment hosted by the client computing system 104 and access the resources via invoking API calls, web service calls, Hypertext Transfer Protocol (HTTP) requests, or other proper mechanisms.

In a simplified example, the risk assessment computing system 130 depicted in FIG. 1 can determine the email legitimacy risk value 120 using email illegitimacy features 112 and the historical email addresses and data 124. The email illegitimacy features 112 can be features predictive of risk that is associated with an email address. Various suitable email illegitimacy features 112 may be used.

Examples of email illegitimacy features 112 used for determining the risk of an entity associated with an email address accessing online resources can include variables physical characteristics of the email address, such as the length of the email username, the length of the full email address, the verification status of the domain of the email address. The features can also include composition of the email address, such as the proportions of vowel, consonant, digit, unique, special, hexadecimal, QWERTY top-, middle-, and bottom-row characters over the email user name or the full email address. The features may further include cross-term compositions, such as the ratio of vowels to consonants, or the ratio of hexadecimal to unique characters. In this way, features can be generated even for email addresses that the risk assessment computing system 130 has never seen before.

In some cases, the email address is not new to the risk assessment computing system 130 and may have historical data associated therewith. For example, the email address may have been used to request access to another online computing environment before. As such, there may be other data associated with this email address, such as the name or address of the user associated with the email address. This data may be stored in the historical email addresses and data 124. In those cases, the risk assessment system may generate additional features by leveraging the historical data 124. For example, the risk assessment system may generate features that show the matching between the email username and an identifier in the historical data, such as the proportion of the first or last name present in the email username text, or the proportion of zip code present in the email username text. In this way, historical data can be utilized to improve the accuracy of the email legitimacy determination.

In a further example, a Markov chain model 128 can be developed based on the historical email addresses and data 124 collected for legitimate email addresses. The Markov chain model 128 can be used to calculate the probability of a character appearing in an email address given its previous characters. For example, the Markov chain model 128 may calculate the probability of a character based on the two previous characters in the email address. The risk-assessment server 118 can use the Markov chain model 128 to calculate a probability for each character in the email address given its previous characters. Based on these probabilities, the risk assessment system can generate another feature for the email address, such as a feature by averaging, multiplying, or otherwise combining these probabilities.

For each of the email illegitimacy features 112 calculated for the email address, the risk-assessment server 118 can determine an illegitimacy score measuring a deviation of the feature from an expected value of the feature. The expected value for a feature can be calculated using the historical email addresses and data 124 in the risk data repository 122. The historical email addresses and data 124 can have previously been identified or determined to be legitimate email addresses. For example, if an email address is associated with a sufficient amount of access requests (e.g., one-hundred access requests) and there are no negative behaviors associated therewith, the email address can be identified as a legitimate email address and included in the historical email addresses and data 124. The email illegitimacy features 112 discussed above (e.g., physical characteristics, composition, and cross-term compositions) can be generated for each of the legitimate email addresses. Feature statistics 126 for a particular feature can be calculated from the values of this particular feature determined for the historical email addresses and data 124. The feature statistics 126 for a feature may include, for example, the median and the IQR of the feature. For example, if the historical email addresses and data 124 include five email addresses with email username lengths of 6 characters, 10 characters, 5 characters, 13 characters, and 20 characters, respectively, the feature statistics 126 for the feature "email username length" can include a median of 10 characters and an IQR of 11 characters.

The same process can be repeated for each feature to obtain the statistics for the corresponding feature. The higher the deviation of the feature value for the email address from the expected value of the feature is, it may be more likely that the email address is illegitimate, and thus the higher the illegitimacy score can be. Some examples may involve calculating a legitimacy score rather than an illegitimacy score. In such examples, a lower deviation of the feature value for the email address from the expected value of the feature can indicate a higher likelihood that the email address is legitimate, and thus the higher the legitimacy score can be. The risk-assessment server 118 can determine that the expected safe value for the feature is the median and the deviation from the expected safe value is measured by the number of IQRs. Similarly, the statistics for a feature may include the mean and standard deviation of the feature. In this case, the expected safe value for the feature can be set to be the mean and the deviation from the expected safe value can be measured by the number of standard deviations.

The risk-assessment server 118 further aggregates the illegitimacy scores for the email illegitimacy features 112 generated for the email address to generate an aggregated illegitimacy score. The aggregation can be performed by calculating, for example, the mean, maximum, sum, or L2 norm of the illegitimacy scores (or legitimacy scores). The risk-assessment server 118 can convert the aggregated score into the email legitimacy risk value 120 through a monotonic transform function. By using the transform function, the email legitimacy risk value 120 can be normalized to a certain range, such as 0-1, and the false positive rate and false negative rate of the legitimacy determination can be adjusted based on parameters and the type of the transform function. In this example, an email legitimacy risk value 120 closer to 1 may represent a higher risk than an email legitimacy risk value 120 closer to 0.

The risk assessment computing system 130 can transmit the email legitimacy risk value 120 for the email address to the client computing system 104. The client computing system 104 can control, based on the email legitimacy risk value 120, access of the user computing system 106 associated with the email address to one or more online computing environments as discussed above.

Each communication within the computing environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 are provided for illustrative purposes. Different numbers of devices may be used. For example, while certain devices or systems are shown as single devices in FIG. 1, multiple devices may instead be used to implement these devices or systems. Analogously, devices or systems that are shown as separate, such as the risk data repository 122 and the risk-assessment server 118, may be instead implemented in a signal device or system.

Figure 2:
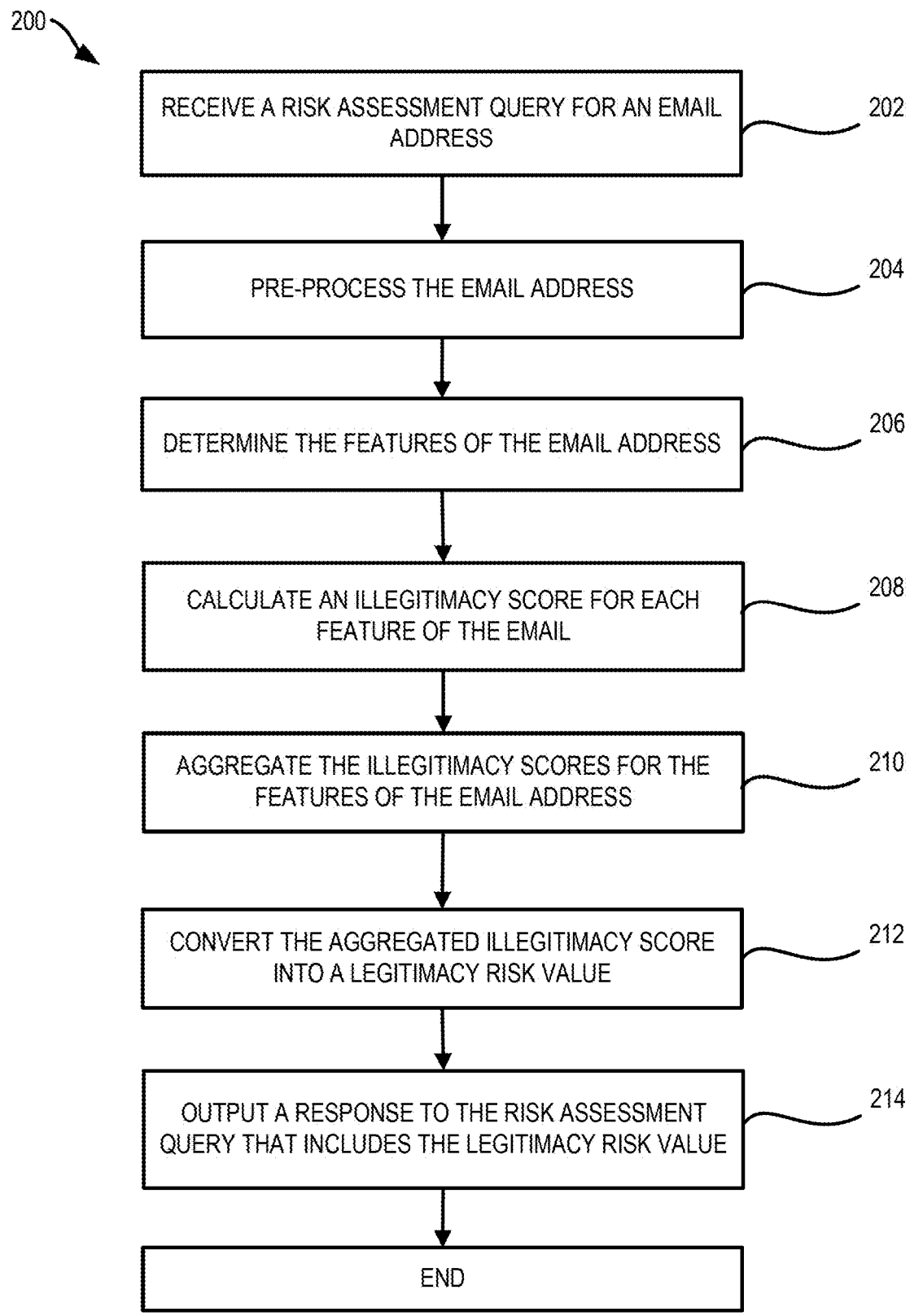
FIG. 2 is a diagram of an example of a process for determining the legitimacy of a given email address to facilitate the determination of the risk of granting access of a computing device associated with the email address to an online computing environment, according to some aspects described herein.

Examples of Operations for Determining Email Legitimacy Risk Value for Access Control FIG. 2 is a flow diagram depicting an example of a process 200 for determining the legitimacy of a given email address to facilitate the determination of the risk of granting access of a computing device associated with the email address to an online computing environment. In some embodiments, one or more computing devices (e.g., the risk-assessment server 118) implement operations depicted in FIG. 2 by executing suitable program code (e.g., the risk-assessment application 114). For illustrative purposes, the process 200 is described with reference to certain examples depicted in the figures. However, other implementations are possible.

At block 202, the process 200 involves receiving a risk assessment query for an email address from a computing device, such as a client computing system 104. In some examples, the computing device submits the risk assessment query in response to receiving, from a user device associated with the email address, a request to access the online platform hosted or otherwise managed by the client computing system 104. The risk assessment query can also be received by the risk-assessment server 118 from a remote computing device associated with an entity authorized to request risk assessment of the email address. In some aspects, the risk assessment query includes data that identifies or can be used to identify the email address. An example of this data includes an identifier of a record in which the email address exists.

At block 204, the process 200 involves pre-processing the email address. The pre-processing may be performed to standardize the email address so that the risk associated with the email address can be accurately determined. For example, the pre-processing may include transforming each letter in the email address to a particular style (e.g., uppercase). Additionally or alternatively, the pre-processing may involve domain-specific processing. For example, a particular character, such as periods, may be removed for an email address having an email domain that does not distinguish email addresses with this particular character from those without this particular character. The risk-assessment server 118 may use a normalization munge function to perform the pre-processing. As an example, an email domain, such as Gmail®, may ignore periods in an email username. For example, "jo.h.nsmi.th@gmail.com" is treated the same as "johnsmith@gmail.com". In addition, the email domain may be associated with two different domain names, such as "@googlemail.com" and "@gmail.com", and may include a special symbol (e.g., "+") such that any characters appearing after it are ignored. In this example, to standardize the email addresses across the domain or multiple domains, the pre-processing can adjust the email address to remove the periods, and convert the email address to a particular domain name of the same email domain. The pre-processing process can further remove the special symbol and the characters appearing after the symbol in the email username.

At block 206, the process 200 involves determining email illegitimacy features 112 of the email address. The email illegitimacy features 112 may be determined based on the characters of the email address itself. The email illegitimacy features 112 may also be determined based on the characters of the email address along with historical data associated with the email address. FIG. 3 shows examples of different types of features that can be determined for an email address. The email illegitimacy features 112 can include physical characteristics of the email address, the composition of the email address, and the cross-term compositions of the email address. These three types of features rely solely on the email address itself. For email addresses that the risk assessment computing system 130 has not seen before, and thus no historical data exists for the email address, the risk-assessment server 118 can use these three types of email illegitimacy features. In some examples, features based on Markov chain analysis may also be used for new email addresses if the Markov chain model is available. For email addresses that the risk assessment computing system 130 has seen previously and has historical data associated therewith, the risk-assessment server 118 can generate additional features that are based on the historical data, such as the features based on email username ID matching shown in FIG. 3.

In the example shown in FIG. 3, features based on physical characteristics can include the length of the email username, the popularity of the selected domain, and a length of the full email address. The features based on the composition of the email address can include the proportions of vowels, consonants, digits, unique characters, special characters, hexadecimals, QWERTY top-, middle-, and bottom-row characters over the length of the email username. Features based on cross-term compositions can include, for example, the ratio of vowels to consonants, hexadecimals to unique characters, or any other combination of the previously described composition character types. FIG. 4 shows examples of the characters that may be contained in an email address.

Features based on Markov chain analysis can be determined to include the probability of the characters appearing in a legitimate email address in the same order that they appear in the given email address. For example, a feature can be obtained by taking the average of the probabilities calculated for individual characters in the email address user name or the full email address. The Markov chain model can be built based on historical email addresses that have been determined to be legitimate email addresses. For example, the set of legitimate historical email addresses can be analyzed to determine the sequence of the characters appearing in the respective email addresses. A Markov chain model can be built to describe the likelihood that each subsequent character in the email address follows the previous N characters. Depending on the implementation, N can take the value of 2, 3, or another integer value. The Markov model helps to answer the question of whether the given email address looks similar to other good email addresses that the system has observed before.

The features based on email username ID matching can be determined based on characters in the email username matching an identifier of a user, such as the name, and address (e.g., the zip code) of the user. For example, it may be common for a legitimate email address to include a majority of a first name or last name of the user, but uncommon for a legitimate email address to include an entirety of a zip code of the user. The risk-assessment server 118 can determine billing information, shipping information, first name, last name, and the zip code from the data previously collected for the email address. The risk-assessment server 118 can then determine the proportion of the provided billing information, shipping information, first name, or last name present in the email username text or the proportion of the provided zip code in the email username text. A threshold may be set for a minimum number of characters to match between the provided information and the email address to consider the email username a match to the provided information. If the email address includes a proportion of the zip code above the threshold, the email address may have a higher illegitimacy score for the email username ID matching feature.

Returning to FIG. 2, if a feature does not apply to an email address the risk-assessment server 118 may impute values for the feature. For example, the risk-assessment server 118 can impute values for features that are based on email username ID matching for email addresses with no historical data. The risk-assessment server 118 may impute a median value of the feature determined from the historical email addresses and data 124, as indicated in the feature statistics 126. Imputing the median value can allow each feature to have a value for subsequent analysis, while ensuring that features that do not apply do not negatively impact the determination of an illegitimacy score. Other ways of imputing a value to a feature that does not apply to an email address may be utilized.

At block 208, the process 200 involves calculating an illegitimacy score for each feature of the email address. The risk-assessment server 118 determines an illegitimacy score, also referred to as a z-score, for each feature. The illegitimacy score measures a deviation of the feature from an expected safe value of the feature. Feature statistics 126 for a particular feature can be calculated from the values of this particular feature determined for the historical email addresses and data 124. The feature statistics 126 for a feature may include, for example, the median and the IQR of the feature. The expected value for a feature can be the median value calculated for the feature and the z-score can be measured by the number of IQRs. Alternatively, the feature statistics 126 for a feature may include the mean and standard deviation of the feature. In this case, the expected safe value for the feature can be set to be the mean and the z-score can be measured by the number of standard deviations.

In some examples, prior to calculating the illegitimacy score, the email illegitimacy features 112 may be pre-screened to automatically identify an illegitimate email address. For example, if the email username includes the entire zip code associated with a user of the email address (e.g., the feature "proportion of provided zip code in the email username" equals 1) or if the email address consists entirely, or nearly entirely, of repeated or hexadecimal characters, the risk-assessment server 118 can determine the email address is illegitimate. In some examples, risk-assessment server 118 can assign a legitimacy risk value higher than a threshold risk value to the email address. The legitimacy risk value being higher than the threshold risk value indicates that the email address is illegitimate. The remaining steps of the process 200 can be skipped.

At block 210, the process 200 involves aggregating the illegitimacy scores for the email illegitimacy features 112 of the email address to generate an aggregated illegitimacy score. The risk-assessment server 118 can calculate an L2 norm of the illegitimacy scores, a sum of the illegitimacy scores, a mean of the illegitimacy scores, a maximum of the illegitimacy scores, or perform any other suitable aggregation calculation. If any of the email illegitimacy features 112 have imputed values for the illegitimacy score as discussed above, the risk-assessment server 118 can be configured to ignore these features from the aggregation to avoid the impact of an imputed illegitimacy score on the aggregated score.

Figure 5:
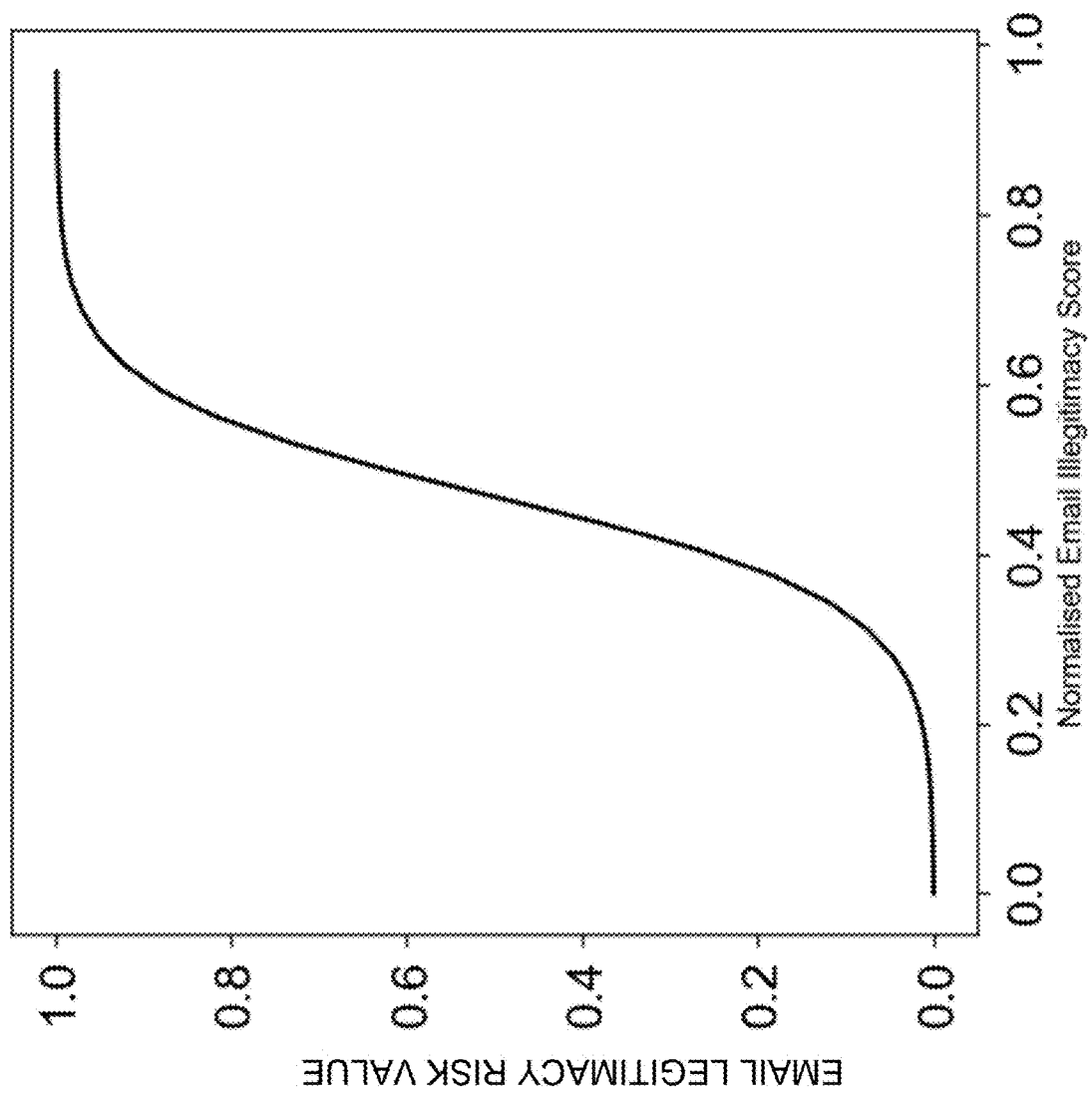
FIG. 5 is a diagram illustrating an example of a transform function used to transform an aggregated legitimacy score to an email legitimacy risk value, according to some aspects described herein.

At block 212, the process 200 involves converting the aggregated illegitimacy score into an email legitimacy risk value 120. The risk-assessment server 118 can use a monotonic transform function to convert the aggregated illegitimacy score into the email legitimacy risk value 120. In some examples, the transform function maps the aggregated illegitimacy score to a value between 0 and 1, with values closer to 1 representing a higher risk. For example, the transform function can be a logistic function. By using the logistic function, the resolution of the email legitimacy risk value 120 for the middle range of the aggregated illegitimacy score can be increased. In some examples, the aggregated illegitimacy score is normalized before the transform function is applied. FIG. 5 is a diagram illustrating an example of a logistic function used to transform the normalized aggregated illegitimacy score to the email legitimacy risk value 120. The false positive rate and false negative rate of the legitimacy determination can be adjusted based on parameters and the type of the transform function.

At block 214, the process 200 involves outputting a response to the risk assessment query that includes the email legitimacy risk value 120. The risk-assessment server 118 can transmit the email legitimacy risk value 120 to the computing system requesting the risk assessment. Based on the email legitimacy risk value 120, the computing system can control access by the user associated with the email address to one or more interactive computing environments as discussed above with respect to FIG. 1.

In some aspects of the present disclosure, one or more operations shown in FIG. 2 may be omitted or performed in a different order. Similarly, additional operations not shown in FIG. 2 may be performed. For example, pre-processing the email address in block 204 may be omitted if the email address is from an email domain that does not have special treatments on certain characters in the email address.

Figure 6:
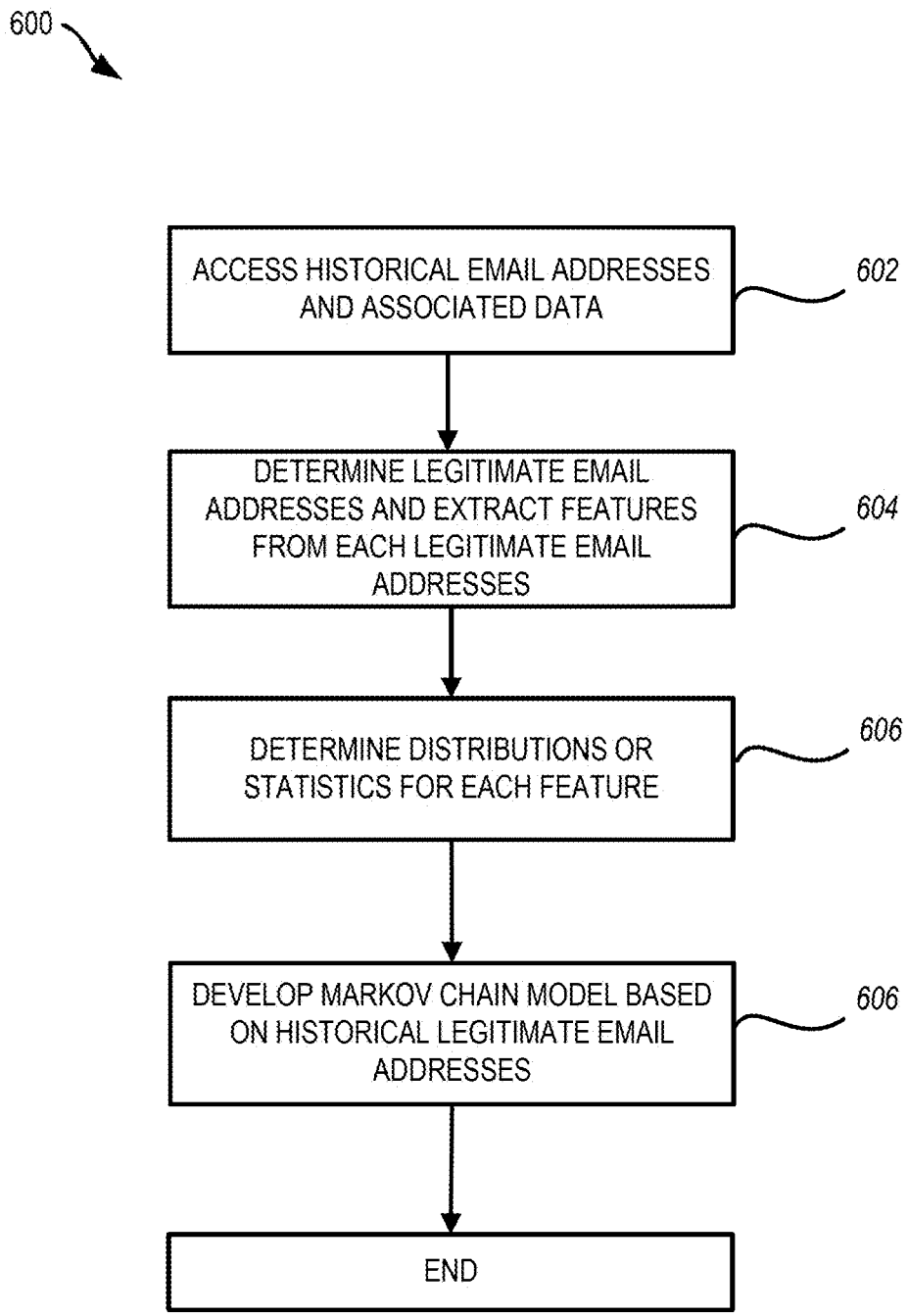
FIG. 6 shows an example of a process for processing historical email addresses and associated data for email legitimacy prediction, according to some aspects described herein.

FIG. 6 shows an example of a process 600 for processing historical email addresses and associated data for email legitimacy prediction. In some embodiments, one or more computing devices (e.g., the risk-assessment server 118) implement operations depicted in FIG. 6 by executing suitable program code (e.g., the risk-assessment application 114). For illustrative purposes, the process 600 is described with reference to certain examples depicted in the figures. However, other implementations are possible.

At block 602, the process 600 involves accessing historical email addresses and data 124. The historical email addresses and data 124 may be email addresses previously received by the risk assessment computing system 130. The historical email addresses and data 124 can be stored in a database (e.g., the risk data repository 122) that is accessible by the risk-assessment server 118. The historical email addresses and data 124 can further include indications of whether transactions or online activities associated with the email address are legitimate or not.

At block 604, the process 600 involves determining legitimate email addresses and extracting features from each legitimate email address. The risk-assessment server 118 can determine an email address is legitimate if the email address is associated with no negative behavior (e.g., no denied payment, no payback). The features extracted for the legitimate email addresses can include the features discussed above with respect to FIGS. 1 and 2, such as features based on physical characteristics of the email address, composition of the email address, cross-term compositions of the email address, Markov chain analysis for the email address, and email username ID matching for the email address.

At block 606, the process 600 involves determining a distribution or feature statistics 126 for each feature. In some implementations, each legitimate email address is duplicated based on the number of times the email address is observed by the risk assessment computing system 130, such as the number of transactions that the email address is involved in. This duplication helps to prevent biases towards single-use and throwaway emails, even if the single-use or throwaway emails are not nefarious. Additionally or alternatively, the risk-assessment server 118 may weight legitimate email addresses based on the number of transactions the risk assessment computing system 130 has received for each email address. For example, an email address associated with one-hundred unique transactions, all of which are "good", can be weighted more highly than an email address associated with only a single "good" transaction. The risk-assessment server 118 can determine the distribution or feature statistics 126 using the duplicating scheme, the weight-based scheme, or both. The feature statistics 126 can include a median and IQRs, or a mean and a standard deviation.

At block 608, the process 600 involves developing a Markov chain model 128 based on the historical legitimate email addresses. As discussed above with respect to FIGS. 1-3, a Markov chain model 128 can be used to determine a likelihood of a character appearing in an email address given its previous characters. The risk-assessment server 118 can then use the Markov chain model 128 to determine an email illegitimacy feature for a new email received with a risk assessment query. The Markov chain model 128 may be email domain specific, or may be built for a mixture of multiple email domains. Building domain-specific Markov chain models can help to capture the cultural or stylistic characteristics of the email addresses in each domain. For example, email address usernames often contain the actual names of the users who created the email addresses. Asian names are very different from American names. As a result, the transition probability from one character to the next character in an email username will be very different for Asian users' email addresses and American users' email addresses. Building separate Markov models for Asian users' email addresses and American users' email addresses will greatly improve the predictability of the Markov models and thus the feature generated based on the Markov models. Based on this observation, in one example, the risk-assessment server 118 is configured to build different Markov models for different domains based on their primary users. For instance, the risk-assessment server 118 can build a Markov model for a domain that is mostly used by Asian users, build a second Markov model for another domain that is mostly used by American users, and so on. To evaluate an email address in a particular domain, the Markov model for that particular domain is used to generate the feature. Compared with a Markov model built for a mixture of domains, these domain-specific Markov models can provide better results.

Figure 7:
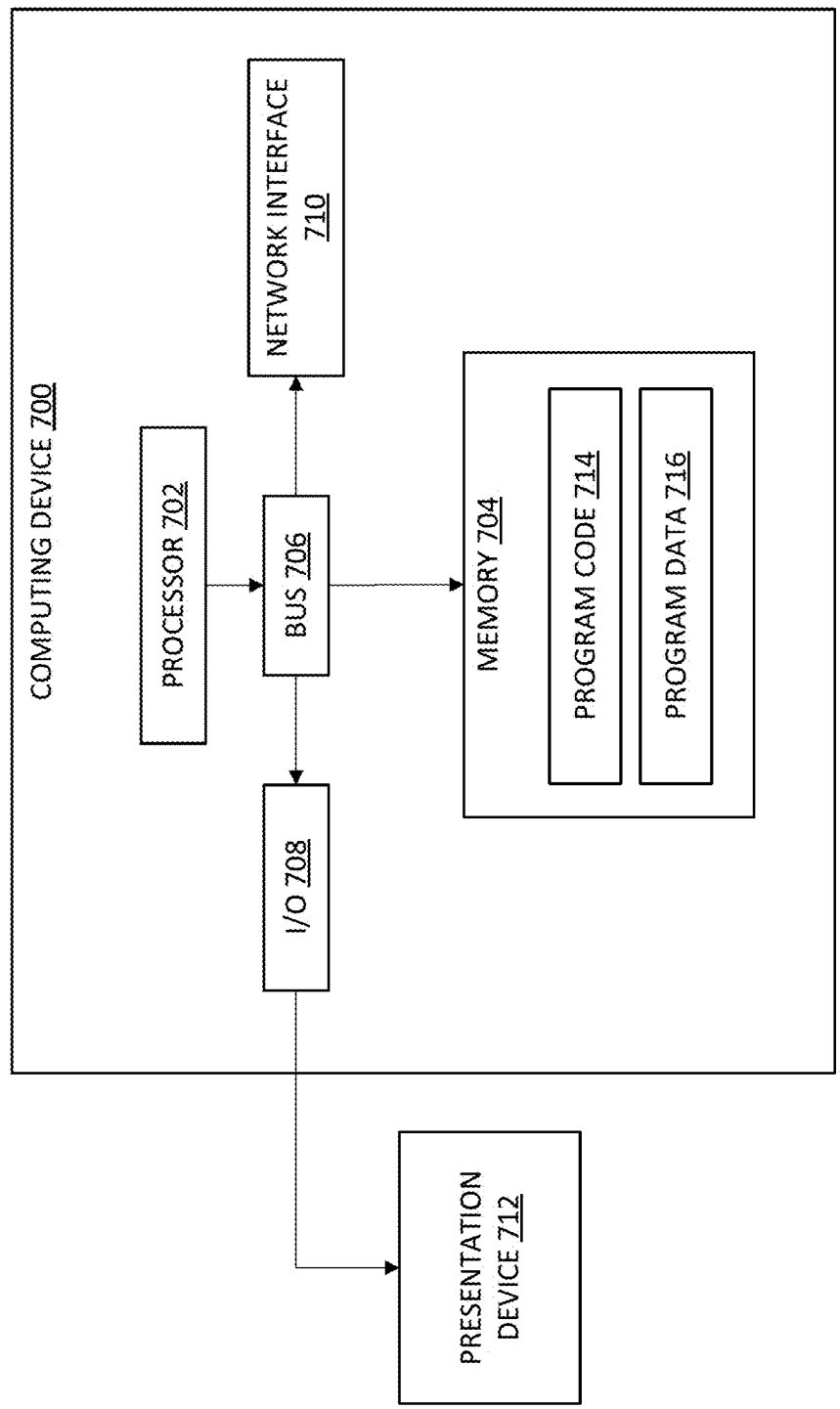
FIG. 7 is a diagram depicting an example of a computing system suitable for implementing aspects of the techniques and technologies described herein.

Example of a Computing System for Determining Email Legitimacy Risk Value for Access Control Any suitable computing system or group of computing systems can be used to perform the operations for the machine-learning operations described herein. For example, FIG. 7 is a block diagram depicting an example of a computing device 700, which can be used to implement the risk-assessment server 118. The computing device 700 can include various devices for communicating with other devices in the computing environment 100, as described with respect to FIG. 1. The computing device 700 can include various devices for performing one or more operations described above with reference to FIGS. 1-6.

The computing device 700 can include a processor 702 that is communicatively coupled to a memory 704. The processor 702 executes computer-executable program code stored in the memory 704, accesses information stored in the memory 704, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 702 include a microprocessor, an application-specific integrated circuit, a field-programmable gate array, or any other suitable processing device. The processor 702 can include any number of processing devices, including one. The processor 702 can include or communicate with a memory 704. The memory 704 stores program code that, when executed by the processor 702, causes the processor to perform the operations described in this disclosure.

The memory 704 can include any suitable non-transitory computer-readable medium. The computer-readable medium can include any electronic, optical, magnetic, or other storage devices capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The computing device 700 may also include a number of external or internal devices such as input or output devices. For example, the computing device 700 is shown with an input/output interface 708 that can receive input from input devices or provide output to output devices. A bus 706 can also be included in the computing device 700. The bus 706 can communicatively couple one or more components of the computing device 700.

The computing device 700 can execute program code 714 that includes the risk-assessment application 114. The program code 714 for the risk-assessment application 114 may be resident in any suitable computer-readable medium and may be executed on any suitable processing device. For example, as depicted in FIG. 7, the program code 714 for the risk-assessment application 114 can reside in the memory 704 at the computing device 700 along with the program data 716 associated with the program code 714, such as the email illegitimacy features 112. Executing the risk-assessment application 114 can configure the processor 702 to perform the operations described herein.

In some aspects, the computing device 700 can include one or more output devices. One example of an output device is the network interface device 710 depicted in FIG. 7. A network interface device 710 can include any device or group of devices suitable for establishing a wired or wireless data connection to one or more data networks described herein. Non-limiting examples of the network interface device 710 include an Ethernet network adapter, a modem, etc.

Another example of an output device is the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the computing device 700 using one or more data networks described herein. In other aspects, the presentation device 712 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A method comprising one or more processing devices performing operations comprising:
    receiving a risk assessment query that identifies an email address;
    determining a plurality of features for the email address, wherein determining the plurality of features comprises determining a feature based on characters contained in the email address;
    for each feature of the plurality of features, determining an expected safe value for the feature by calculating a median value of the feature for a set of legitimate historical email addresses, wherein calculating the median value of the feature comprises determining a weight for each legitimate historical email address of the set of legitimate historical email addresses based on a number of interactions of the legitimate historical email address with a risk assessment computing system;
    for each feature of the plurality of features, calculating an illegitimacy score by calculating a deviation of the feature from the expected safe value for the feature;
    aggregating the illegitimacy scores of the plurality of features into an aggregated illegitimacy score; and
    transmitting a legitimacy risk value indicating the aggregated illegitimacy score to a remote computing system for use in controlling access of a computing device associated with the email address to one or more interactive computing environments.

2. The method of claim 1, further comprising:
pre-processing the email address to standardize the email address.

3. The method of claim 1, wherein determining the feature based on characters contained in the email address comprises one or more of:
determining the feature based on physical characteristics of the email address;
determining the feature based on compositions of the email address; or
determining the feature based on cross-term compositions of the email address.

4. The method of claim 1, wherein determining the feature based on characters contained in the email address comprises:
calculating, based on a Markov model, a probability of a character in the email address appearing after one or more characters preceding the character; and
generating the feature based on the calculated probability.

5. The method of claim 1, wherein determining the plurality of features further comprises determining the feature based on characters contained in the email address and historical data associated with the email address.

6. The method of claim 1, wherein calculating the deviation of the feature from the expected safe value for the feature that is determined from historical email addresses comprises:
calculating a number of interquartile ranges from the feature to a median value for the feature determined from historical email addresses; or
calculating a number of standard deviations from the feature to a mean value for the feature determined from historical email addresses.

7. The method of claim 1, wherein aggregating the illegitimacy scores of the plurality of features comprises:
calculating an L2 norm of the illegitimacy scores of the plurality of features;
calculating a sum of the illegitimacy scores of the plurality of features;
calculating a mean of the illegitimacy scores of the plurality of features; or
determining a maximum of the illegitimacy scores of the plurality of features.

8. The method of claim 1, further comprising:
converting the aggregated illegitimacy score into the legitimacy risk value through a monotonic transform function, wherein the monotonic transform function comprises a logistic function.

9. The method of claim 1, further comprising:
determining that the email address contains a zip code associated with a user of the email address or that the email address contains solely hexadecimal characters; and
assigning a legitimacy risk value higher than a threshold risk value to the email address, the legitimacy risk value higher than the threshold risk value indicating that the email address is illegitimate.

10. A non-transitory computer-readable storage medium having program code that is executable by a processor device to cause a computing device to perform operations, the operations comprising:
receiving a risk assessment query that identifies an email address;
determining a plurality of features for the email address, wherein determining the plurality of features comprises determining a feature based on characters contained in the email address;
for each feature of the plurality of features, determining an expected safe value for the feature by calculating a median value of the feature for a set of legitimate historical email addresses, wherein calculating the median value of the feature comprises determining a weight for each legitimate historical email address of the set of legitimate historical email addresses based on a number of interactions of the legitimate historical email address with a risk assessment computing system;
for each feature of the plurality of features, calculating an illegitimacy score by calculating a deviation of the feature from the expected safe value for the feature;
aggregating the illegitimacy scores of the plurality of features into an aggregated illegitimacy score; and
transmitting a legitimacy risk value indicating the aggregated illegitimacy score to a remote computing system for use in controlling access of a computing device associated with the email address to one or more interactive computing environments.

11. The non-transitory computer-readable storage medium of claim 10, the operations further comprising:
pre-processing the email address to standardize the email address.

12. The non-transitory computer-readable storage medium of claim 10, wherein determining the feature based on characters contained in the email address comprises one or more of:
determining the feature based on physical characteristics of the email address;
determining the feature based on compositions of the email address; or
determining the feature based on cross-term compositions of the email address.

13. The non-transitory computer-readable storage medium of claim 10, wherein determining the feature based on characters contained in the email address comprises:
calculating, based on a Markov model, a probability of a character in the email address appearing after one or more characters preceding the character; and
generating the feature based on the calculated probability.

14. The non-transitory computer-readable storage medium of claim 10, wherein determining the plurality of features further comprises determining the feature based on characters contained in the email address and historical data associated with the email address.

15. The non-transitory computer-readable storage medium of claim 10, wherein calculating the deviation of the feature from the expected safe value for the feature that is determined from historical email addresses comprises:
calculating a number of interquartile ranges from the feature to a median value for the feature determined from historical email addresses; or
calculating a number of standard deviations from the feature a mean value for the feature determined from historical email addresses.

16. A system comprising:
a processing device; and
a memory device in which instructions executable by the processing device are stored for causing the processing device to perform operations comprising:
receiving a risk assessment query that identifies an email address;

determining a plurality of features for the email address, wherein determining the plurality of features comprises determining a feature based on characters contained in the email address;

for each feature of the plurality of features, determining an expected safe value for the feature by calculating a median value of the feature for a set of legitimate historical email addresses, wherein calculating the median value of the feature comprises determining a weight for each legitimate historical email address of the set of legitimate historical email addresses based on a number of interactions of the legitimate historical email address with a risk assessment computing system;

for each feature of the plurality of features, calculating an illegitimacy score by calculating a deviation of the feature from the expected safe value for the feature;

aggregating the illegitimacy scores of the plurality of features into an aggregated illegitimacy score; and transmitting a legitimacy risk value indicating the aggregated illegitimacy score to a remote computing system for use in controlling access of a computing device associated with the email address to one or more interactive computing environments.

17. The system of claim 16, wherein determining the feature based on characters contained in the email address comprises one or more of:

determining the feature based on physical characteristics of the email address;

determining the feature based on compositions of the email address; or determining the feature based on cross-term compositions of the email address.

18. The system of claim 16, wherein the operations further comprise:

converting the aggregated illegitimacy score into the legitimacy risk value through a monotonic transform function, wherein the monotonic transform function comprises a logistic function.

19. The system of claim 16, wherein calculating the deviation of the feature from the expected safe value for the feature that is determined from historical email addresses comprises:

calculating a number of interquartile ranges from the feature to a median value for the feature determined from historical email addresses; or calculating a number of standard deviations from the feature a mean value for the feature determined from historical email addresses.

20. The system of claim 16, wherein determining the feature based on characters contained in the email address comprises:

calculating, based on a Markov model, a probability of a character in the email address appearing after one or more characters preceding the character; and generating the feature based on the calculated probability.

* * * * *